Aug. 18, 1959
J. VIVARI
2,899,910
AMUSEMENT AND EDUCATIONAL DEVICE
Filed June 3, 1955
3 Sheets-Sheet 2
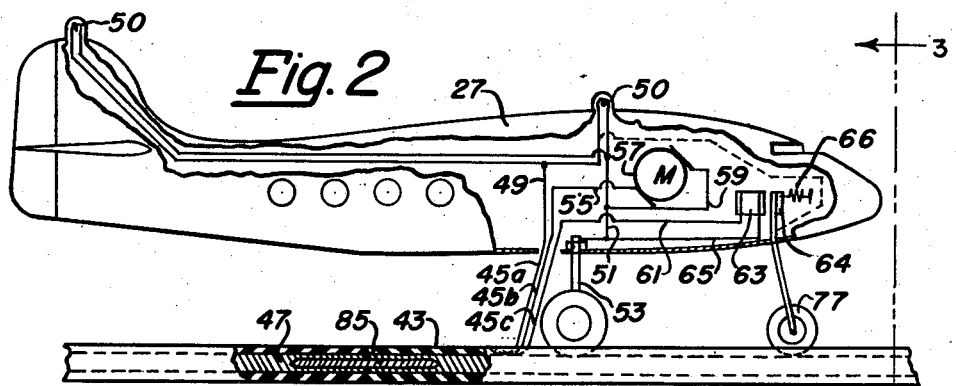
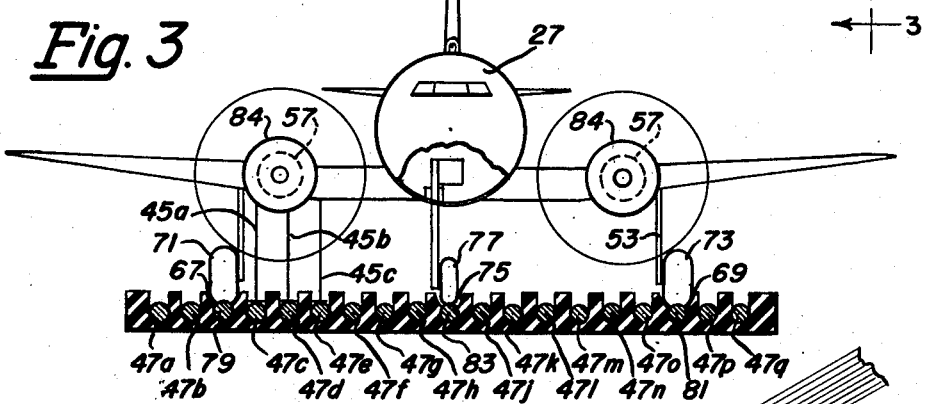
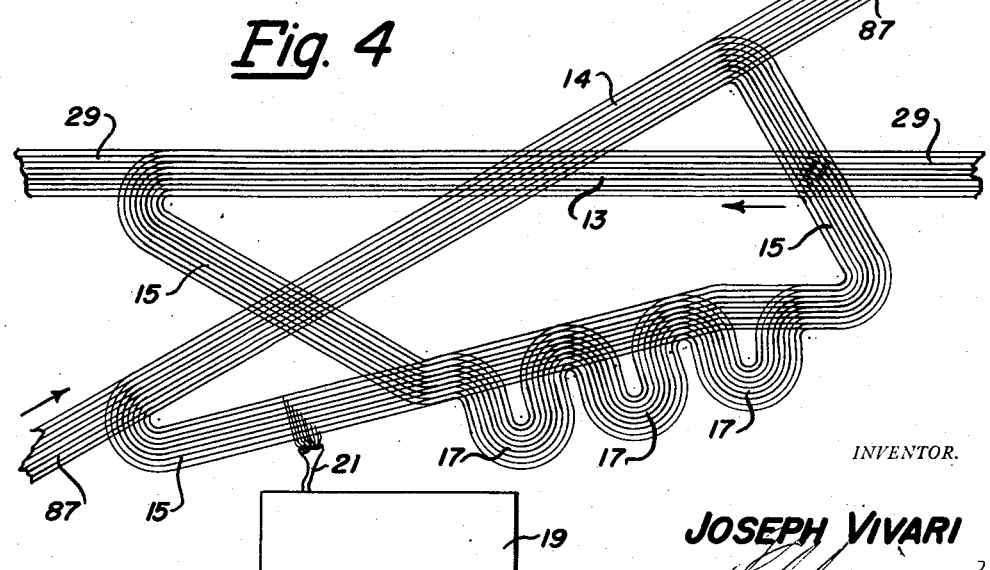
INVENTOR.
JOSEPH VIVARI
BY
ATTORNEY

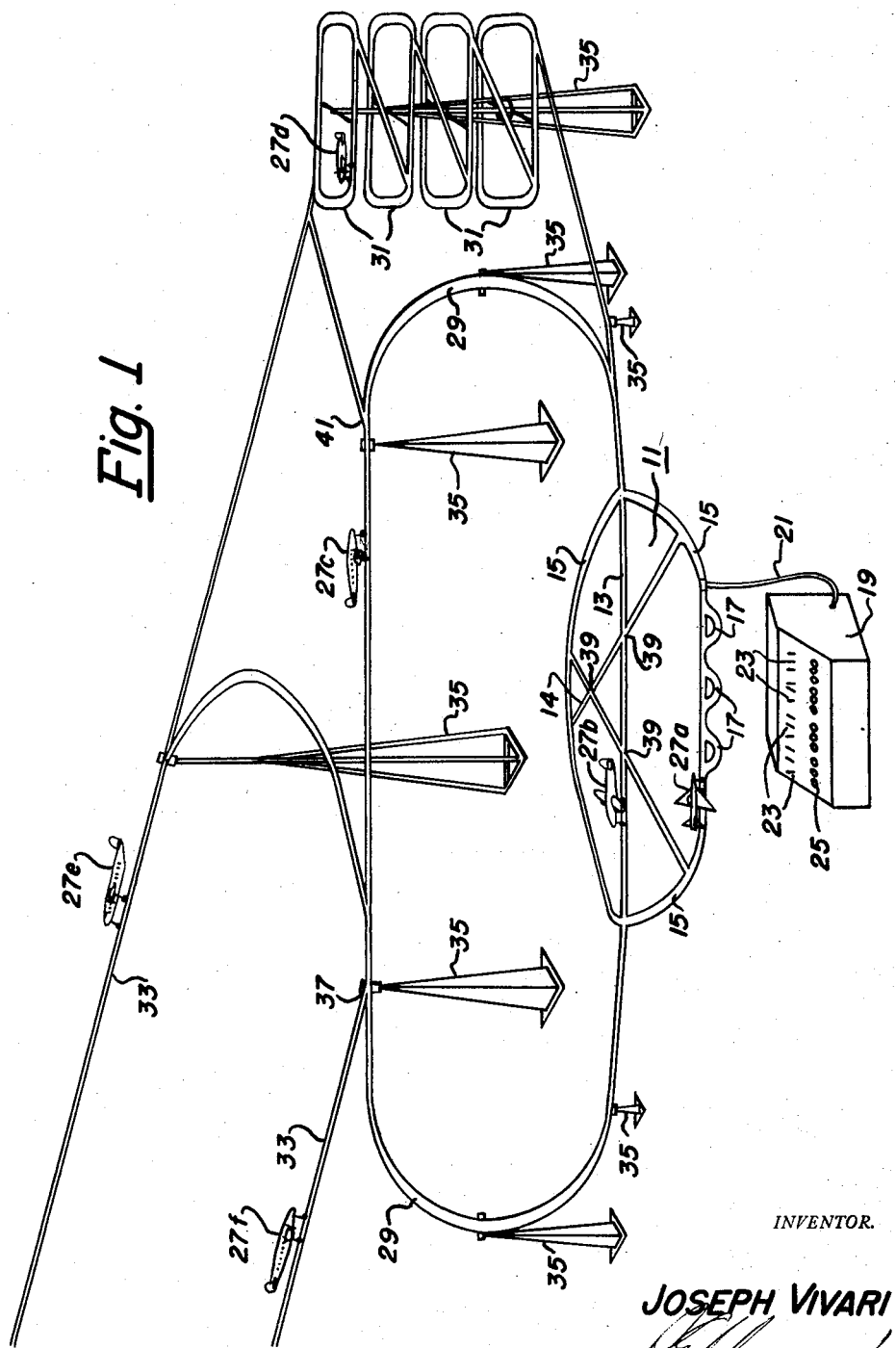

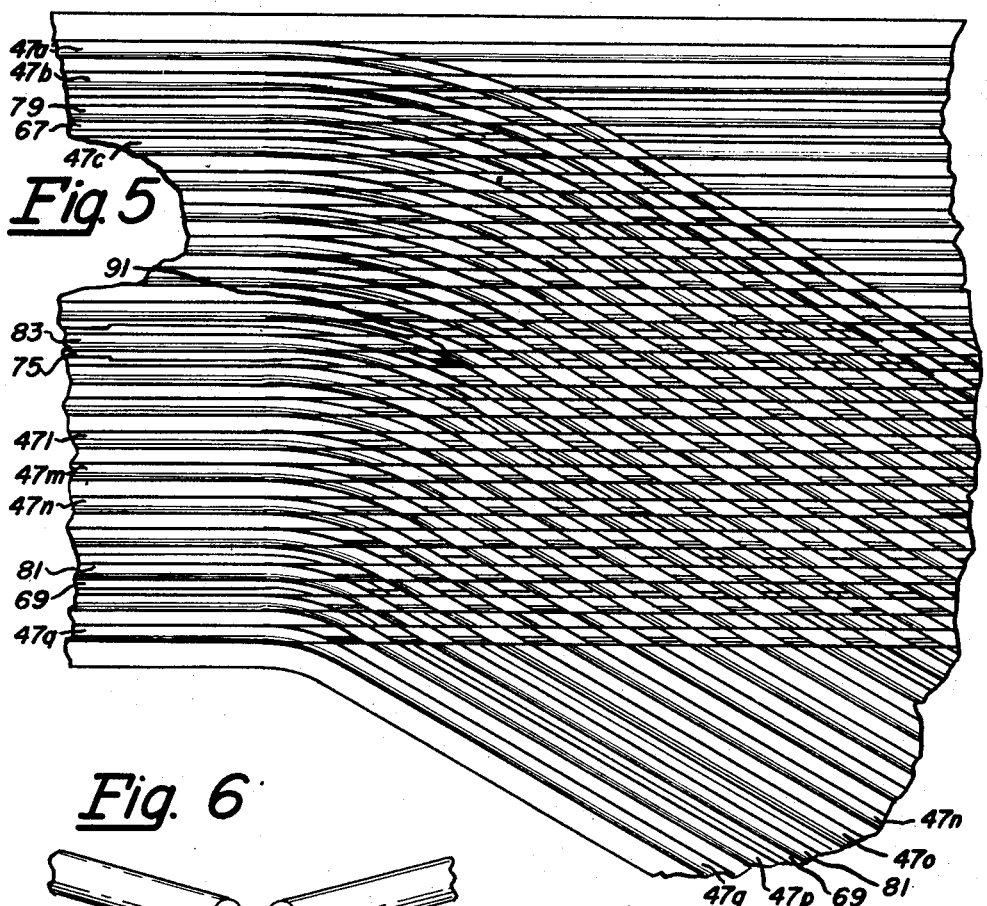
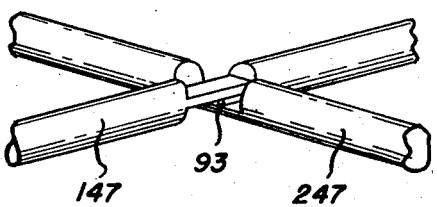
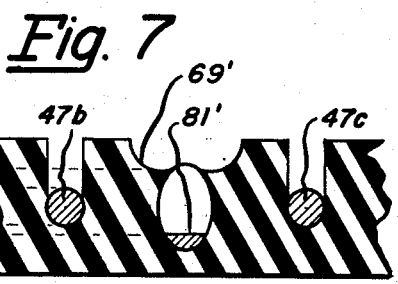
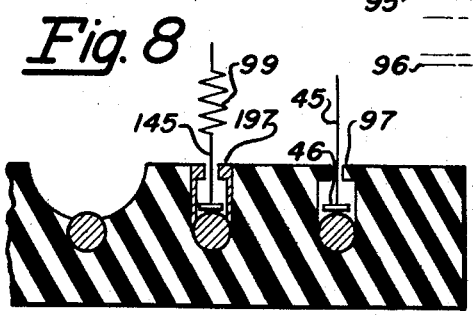

United States Patent Office 2,899,910
Patented Aug. 18, 1959

2,899,910

AMUSEMENT AND EDUCATIONAL DEVICE

Joseph Vivari, Green Acres, Md.

Application June 3, 1955, Serial No. 513,128

4 Claims. (Cl. 104—150)

This invention pertains to amusement and educational devices, and more particularly to devices which enable an operator to control a number of vehicles on the same track to simulate traffic conditions.

An object of the invention is to provide an improved amusement and educational device which provides for the individual control of several toy vehicles so that the operator can determine the course, speed and other controls of a number of separate vehicles operating on the same track.

The invention is applicable to the control of any suitable kind of vehicle and for purposes of illustration it is herein applied to the simulated operations of aircraft on an airport or landing area, and to such aircraft in the air in aircraft traffic patterns, holding patterns and on civil airways. The aircraft are electrically operated along a track which is shaped to simulate the traffic patterns, holding patterns, and civil airways, and are controlled in these functions in a manner much like that exercised by an airport traffic control tower.

Another object of the invention is to provide a novel toy amusement and educational device simulating an airport traffic control operation or the like wherein the functions of the individual aircraft or the like are under control of the operator.

A further object of the invention is to improve toys for simulating aircraft operation wherein a number of aircraft can be operated simultaneously but individually controlled to start, stop, vary speed, steer, operate engines, flaps, navigation lights, landing lights, loading stairs and other controls as desired.

Still another object of the invention is to provide an improved device which will depict in three dimensions the flight paths likely to be made by aircraft in traffic patterns, holding patterns and civil airways and which enables the operation of toy aircraft along a track to simulate the aircraft while it is airborne and on runways, taxiways, and parking areas on the ground.

Another object of the invention is to provide an improved track or self-propelled toys, wherein the track contains multiple conductors suitably fixed side-by-side in non-conductive material, which conductors are used to conduct energy to the drive and control mechanisms of a number of self-propelled toys on the same track, each being individually controlled.

Yet another object of the invention is to improve the construction of track switches for self-propelled vehicles to obtain more flexibility in the operation of such devices.

Still another object of the invention is to provide an improved toy aircraft set which is relatively simple in constructions, sturdy, inexpensive, and easy to operate.

Briefly, in accordance with the invention, an improved toy aircraft amusement and educational device is provided which utilizes small toy aircraft propelled by electric motors geared to the wheels or driving by means of the thrust of the propellers or jet airstream. The aircraft operates along a track which has a number of conductors insulated from each other but exposed on the top side of the track. These conductors are connected at the control point with a power supply which controls the power furnished to each of the several conductors to effect electrical operation of the drive mechanisms, steering mechanisms, lights, flaps, and other functions of a number of vehicles simultaneously on the track. The wheels of the aircraft in one embodiment are used as current collectors and for the steering function at track switches. In addition to the wheels, a number of additional current collectors extending from the aircraft undercarriage engage the proper conductors in the track to provide the control functions for that aircraft.

Track arrangements are made to simulate the airport runways, taxiways, and parking areas, and elevated tracks supported on standards from the floor or from the wall or ceiling are used to simulate the air traffic patterns, holding patterns, and civil airways. A more effective simulation is obtained by making the runways, taxiways, and parking areas of black or colored plastic material and the airborne portion of the track of transparent plastic material. The track itself may advantageously be made in sections of standard shape which can be joined together to represent any desired arrangement of runways, taxiways, holding patterns, traffic patterns, etc.

A feature of the invention lies in the construction of the conductors at the places in the track which are track switches or intersections. The conductors are arranged in such a fashion that they are insulated from each other, but electrical continuity is maintained and the collectors follow a single conductor without losing contact in the intersection.

A more complete description follows in conjunction with the accompanying drawings wherein:

Fig. 1 is a perspective view of an amusement and educational device in accordance with the invention showing a general layout of an airport with runways, traffic patterns, holding patterns etc.;

Fig. 2 is a side elevation of an aircraft in position on a section of track;

Fig. 3 is an elevation, partly in cross section, taken along the line 3—3 of Fig. 2;

Fig. 4 is a plan view of a typical landing area embodying the invention;

Fig. 5 is a plan view of a track switch in accordance with the invention;

Fig. 6 is a perspective view of an intersection of two conductors of the track like those which occur in Fig. 5;

Fig. 7 is a fragmentary elevation in section of an alternative arrangement to that of Fig. 3; and Fig. 8 is an elevation in section of an alternative showing of the track conductors and current collectors.

Figure 1 shows a representative general arrangement of the amusement and educational device of the invention. An airport or landing area 11 has a number of runways 13, 14, taxiways 15, and parking areas 17. The runways 13, 14, taxiways 15, and parking areas 17 are constructed of track sections having a number of conductors in spaced side-by-side relationship in an insulating base or carrying body. The structure of the track is shown and described in greater detail with reference to Figs. 2, 3, 5, 6, 7, and 8 hereinafter.

A power supply and control station 19 is connected by means of a multiconductor cable 21 to an adjacent section of track on a runway, taxiway, or parking area. The multiple conductors in the track sections forming the runways 13, 14, taxiways 15, and parking areas 17 are continuous throughout the length of the connected track so that voltage and therefore current is supplied to the entire track arrangement identically.

The power supply and control station 19 contains a plurality of switches 23 and indicators 25, which indicators may be, for example, lights or magnetically controlled visual signals or "drops." The switches 23 and indicators 25 enable an operator to control a plurality of different functions of different tracked vehicles, and at the same time to tell at a glance the electrical condition of a given control conductor in the cable 21 and the track sections.

A number of toy aircraft 27a, 27b, 27c, 27d, 27e, and 27f are shown in various positions along the track. One aircraft 27a is shown on a taxiway 15, and another aircraft 27b is shown on a runway 13. Along a track section 29 which represents the traffic pattern for the airport 11, there is shown a third aircraft 27c. On the track sections representing the holding pattern 31, an aircraft 27d is shown in the "stack." Two other aircrafts 27e and 27f are shown leaving and arriving respectively along the civil airways 33 which connect with the traffic pattern 29.

It is preferred to make the track sections for the runways 13, 14, taxiways 15, and parking areas 17 out of a plastic or hard rubber or other suitable insulating material having a black or dark color to simulate macadam paving often found in airports. Alternatively, these track sections which represent ground level may be made a grey or light beige color to give the illusion of cement or concrete runways. The sections of track representing the traffic pattern 29, the holding pattern 31, and civil airways 33 are preferably made of transparent plastic material.

The portions of the track 29, 31, 33 which represent an airborne condition of the aircraft may advantageously be supported on standards 35 to elevate them above the level of the airport 11 and thus give a three-dimensional representation of the airport operation.

At each point that the track divides or comes together, such as the joining of the civil airways 33 with the traffic pattern 29, there is a track switch 37. The structure of such a track switch is shown in detail and described in conjunction with Figs. 5 and 6, infra. At points where two tracks cross, for example the runway intersections on the airport 11, there is located a crossing 39, which is also explained in conjunction with Fig. 6, infra.

The behavior of an aircraft, for example 27c, when it reaches a track switch, such as the track switch 41 between the traffic pattern 29 and the holding pattern 31, does not depend upon any condition of the track switch itself. The switching action is controlled by the steering apparatus within the airplane 27c. The steering apparatus is electrically conditioned to cause the aircraft to select a right or left course by means of one or more steerable wheels.

Referring now to Fig. 2, which is a side elevation of an aircraft 27 in position on a section of track 43, a plurality of current collectors 45 extend from the undercarriage of the aircraft 27 and are in resilient sliding contact with a number of individual conductors 47 having one side secured or affixed in the track section 43, but having their upper surface exposed. The current collectors extend within the vehicle 27 to electric motors and electrical control elements for propelling and controlling the functions of the vehicle. Functions normally under control of the pilot of an airplane are thus controlled remotely from the panel 19 of Fig. 1. Some of the functions which are controllable in accordance with the invention in a toy airport and control tower operation are: steering by means of the leading wheel or wheels, such as the nose wheel of the aircraft 27 in Fig. 2; navigation and landing lights; flaps, elevators, rudder, and other airborne adjustments of steering; loading stairs; and other similar controls which may be desired.

Typical internal wiring is shown in Fig. 2 for three control functions. One of the collectors 45a is internally connected to a wire 49 which extends to the navigation lights 50. The other side may be returned through a separate return wire 51 which is connected to the wheel support 53 to complete a metallic path back to another track conductor. Another wire 55 extends from one of the collectors 45b to the motor 57. The return wire 59 from the motor 57 is also connected to the wheel support 53. A wire 61 from another of the collectors 45c extends to a steering relay 63. The return circuit is over a wire 65, also connected to the wheel support 53 to complete the loop back to the track.

The steering relay 63 has a movable armature 64 which is mechanically coupled to a steerable nose wheel 77. The movable armature 64 is biased by a spring 66 to keep the aircraft 27 on a straight course, or in the arrangement shown on Figs. 2 and 3, to the right at track switches. When current is supplied over the conductor with which the collector 45c connected to the winding of the relay 63 makes contact, the armature 64 is attracted, mechanically turning the steerable wheel 77 to the left, causing the aircraft 27 to select the left course at the track switches.

Fig. 3 is a view taken along the line 3—3 of Fig. 2, showing the track in cross section and the aircraft 27 in front elevation. The disposition of the individual conductors 47a through 47q fitted into grooves in the hard rubber or plastic track 43 enables the current collectors 45 to engage the upper exposed surfaces of the conductors 47. The conductor members 47 are shown round in shape, but other cross-sectional configurations, such as oval, rectangular, or square, may be desirable for certain purposes.

Continuing the example described in conjunction with Fig. 2 together with Fig. 3, one current collector 45a, which is internally connected to the wire 49 for the navigation lights 50 as shown in Fig. 2, may make contact with the track conductor 47c. The navigation lights are given their customary flashing action by supplying an on-and-off flashing voltage to the conductor 47c.

Similarly, another collector 45b makes contact with a second selected conductor 47d and is internally connected to the motor 57. A third conductor 47e is contacted by a current collector 45c which extends electrically through the wire 61 to the steering relay 63.

Another aircraft which is to operate on the same track layout as the one in the example just described, but which is to be separately controlled, has its current collectors 45 on a different set of conductors 47j, 47k, 47l, and so on. In this way, the drive and function control of each of the aircraft may be separately regulated from the control panel.

All the collectors 45 shown in the drawing are resilient wires which make a sliding contact with the conductors 47. It will be appreciated that small wheels of conductive material may be journalled to the ends of the collectors to provide rolling contact between the collectors and the conductors. With such wheels, the diameter is chosen large enough so that the collector will bridge a gap in the open portion of the conductor which occurs at track switches, shown most clearly in conjunction with Fig. 6, without shorting to another conductor in the gap.

There are three grooves or surfaces of deformation shown in the track section of Fig. 3 which are larger than the others. The two outside large grooves 67 and 69 accommodate the wheels 71, 73, of the aircraft 27 with a complementary shape to that of the wheels 71, 73. The middle groove 75 accommodates the steerable nose wheel 77. The nose wheel 77 on a straight section of track acts to keep the aircraft on a straight course. When the aircraft encounters track switches, such as the track switch 41 of Fig. 1, the angle of the nose wheel is altered to point right or left in order to steer the airplane 27 along the selected track. This will be explained further in conjunction with Fig. 5 (hereinafter). The aircraft wheels 71, 73 are used as the common return to the power supply since the conductors 79, 81 associated with these larger grooves can be made conveniently of heavier gauge.

It also appears advantageous to use the nose wheel 77 as the current collector for the navigation lights, and accordingly the flashing voltage may conviently be supplied over the center conductor 83 in the groove 75. This is done because the flashing navigation lights are most often the only function which is common to all the aircraft in the set. Since all aircraft on all the track sections contact the two return conductors 79, 81, and the center conductor 83, this appears to be a desirable use of the center conductor 83. Of course, should any other function be thought advisable to make common to all aircraft in the set, the center conductor 83 could be utilized for that function instead.

The motors 57, in this embodiment, turn the aircraft propellers to produce the thrust for moving the vehicle. In this arrangement, the motors 57 are located in the wings in the motor housings 84, and the propeller shaft is an extension of the motor shaft or may be geared to the motor shaft. Alternatively, the motor 57 may be located in the fuselage, and the propeller shafts driven by belt drive, gearing or other suitable mechanical coupling.

For models representing jet aircraft, the motor is located in the fuselage and is mechanically coupled to a small internally contained turbine which produces a jet stream in much the same manner as that of ordinary jet aircraft.

Referring now again to Fig. 2, there is shown in partial cross section a joint in one of the conductors 47. A hole is formed in each end of the conductors 47 and a pin 85 is secured in one side of the joint by being threaded, press-fitted, soldered, etc. When the track sections are pressed together the pin 85 completes the electric circuit from one portion of the track to the next.

In Fig. 4 is shown a plan view of a typical landing area or airport having two runways 13, 14 and connecting taxiways 15. Parking areas 17 are provided adjacent a taxiway 15 to allow the aircraft used on the set to simulate the loading operation.

In the arrangement shown in Fig. 4, one airborne traffic pattern track 29 is shown as an extension of one runway 13, while a second traffic pattern track 87 is shown as extensions of another runway 14. If the approaching traffic is routed toward the left (in the direction of the arrow at the right hand end of runway 13), the aircraft can be caused to make a left turn at the end of the runway 13 onto a taxiway 15 and thence to make a right turn onto any of the parking areas 17. When the aircraft is to be dispatched it proceeds out the taxiway 15 to the end of runway 13.

From an inspection of Fig. 4 it will be apparent that traffic may proceed in either direction in such a set-up, or if desired, one runway 13 may be used for handling traffic moving toward the left hand end of the airport, and another runway 14 may be used for handling traffic moving toward the right.

Fig. 5 is a plan view of a track switch in accordance with the invention which illustrates how the surfaces of deformation or larger grooves 67 and 69 for the aircraft wheels, the middle groove 75 for the steerable nose wheel and the several conductors in their grooves are disposed at a place where the track divides or comes together.

The conductors at the switch are insulated where they cross each other by forming one set of conductors to pass the intersection at the lowest level and forming the other set of conductors to pass the point of intersection at a higher level but still below the top level of conductors in straight sections of track. In other words, one set of conductors is grooved or cut out or deformed by swaging on only one side to leave the upper and center portions clear. The other set of conductors is grooved or swaged on both sides to leave the upper and lower portions clear.

When the conductors, formed in this fashion, are installed, conductors turning in one direction (toward the left for example) will occupy the lowest level at each intersection. Those turning in the other direction (toward the right) will occupy the center position of a cross-section of the conductor and will be air-spaced from those underneath.

The conductors at the switch point appear to be interwoven, although actually all of those turning toward the right (in this example) are on top at a conductor intersection.

The current collectors 45 following a certain groove and in contact with a selected collector have a large enough radius of curvature to bridge across the gap at the intersection. The collectors 45 do not extend far enough down into the cut-out space forming the gap to make contact with the top of the conductor which appears to be on top in the gap. In this way the collectors themselves neither break contact with the conductors that they are following, nor do they cause a short circuit between one conductor and another. The aircraft is thus assured of a continuous supply of electrical energy even though it should be intentionally stopped on a switch. Since there are no "dead spots," all functions of the aircraft will operate over the entire track layout without depending upon the motional inertia of the vehicle to carry it past switch points.

The middle groove 75 is widened for a short distance just before the switching point is encountered to enable the nose wheel of the aircraft to be canted or partially turned before it reaches the switching point. The nose wheel, by being permitted to partially turn in the groove 75, presents, in effect, a steering wedge pointed in the selected direction. When the nose wheel encounters the division point a switching block 91 is met by the canted nose wheel, and the aircraft is turned in the direction selected by the wheel.

It will thus be seen that the steering of the aircraft at the various switching points is controlled by the operator through the steering mechanism in the airplane rather than by the condition of a switch. Furthermore, one single type of switch may be used for all intersections regardless of the direction in which the vehicle is proceeding. The standard types of switches which would be necessary to form even complicated lay-outs are one in which one track continues in straight line while another diverges to one side as shown in Fig. 5, and that type in which both of the tracks diverge from the straight line of the combined track. The first type need be provided with both right and left divergences at standard angles (30°, 45°, 60°), up to 90 degrees.

Fig. 6 is a fragmentary showing in perspective of a conductor intersection which occurs as explained in conjunction with Fig. 5 above, and which likewise will be present in track crossings where no switching operation takes place.

A first conductor 147 is shown as being grooved or cut out between top and bottom, leaving the center portion continuous across the point of intersection. The second conductor 247 has the top and middle portions removed, leaving the bottom continuous across the point of intersection.

At ordinary operating voltages for toy devices it will be appreciated that the air-space provided by the conductor deformation will sufficiently insulate one conductor 147 from the other 247. However, a small thin piece of insulating material may be used between the conductors to further insure that no short circuits occur at the switches and crossings. This is shown as a block of insulating material 93 in Fig. 6. Where insulating material is used, it is desirable to attach the blocks of insulating material by means of an insulating cement to the conductors 247 which are placed on the bottom in the intersection. The conductors 147 are then placed in their respective grooves, and serve as further means to maintain the insulation 93 in place.

Fig. 7 is an alternative arrangement of the wheel guide grooves and the associated conductors; wheel guide groove 69 and associated conductor 81 of Fig. 3, for example. The upper dotted line 95 of Fig. 7 indicates the wheel guide level. At the intersection of the return conductor 81', the return conductor is grooved, swaged or cut out to a level 96 below that of the function control conductor 47b, for example. Thus the main return conductor 81' is separated from the function control conductor 47b in the track and no necessity exists for deforming the function control conductor 47b at the points where it crosses the main return conductor 81'.

Also, since the wheels run at a higher level than the top of the function control conductor 47b, the wheels themselves do not act to short circuit the conductor 47b to the return path. Further, the large diameter of the wheels 71, 73 of the aircraft enable these wheels to bridge a gap easily without penetrating to the level of the top of the conductor 47b.

An alternative arrangement of the conductors and collectors is shown in Fig. 8. In this arrangement the current collectors 45 are held captive in the grooves by two lip-like extensions 97 at the top of the grooves which produce a reduced width opening narrower than the width of the collector shoe 46.

The purpose of providing the overhanging sides formed by the lip-like extensions 97 is two-fold: First, in an arrangement where it is desired to use appreciable voltage between the conductors 47 and the return conductors 79, 81, the reduced width of the groove makes it less likely that an accidental electrical shock could be received from the track section by the operator or observer; second, if the lip-like extensions are metallic (as the left conductor and lip 197) and integral with the conductor 47 on long straight airborne sections of track, the aircraft itself may become airborne from the track by supplying more power to the motors driving the propellors or producing the jet stream. For such a system the current collectors 145 are made extendable, for example by providing a resilient conductive spring 99 (such as Phosphor bronze) as part of the length of the current collector.

For the sake of realism it is preferred to supply the motive power of the aircraft through the thrust provided by the propellers for propeller driven aircraft, and by a jet airstream produced by an internally contained turbine for jet aircraft. It is appreciated, however, that in toys it is desirable to make the toy itself a safe instrument. It is therefore also contemplated that the aircraft be driven from the motors through belt or gear driven mechanisms operating the landing gear wheels.

It is also contemplated that the control system for tracked toys or amusement devices, explained above with particular reference to an aircraft arrangement, is equally adaptable to operating a number of vehicles on the same track or roadbed in which the vehicles are other than aircraft. For example, an arrangement representing a typical street plan can be used with toy automobiles controlled individually by the operator. Also the principles of the invention are applicable to control a number of toy trains on the same track.

I claim:

1. An amusement and educational device comprising an interconnected system of a plurality of lengthwise supporting and guiding common courses for wheels of a plurality of wheeled vehicles, said courses each including a base structure for supporting said vehicles and vehicle wheel guide elements extending longitudinally of said base, each guide element comprising an upwardly projecting wall fixed to said base and adapted to be engaged by sides of vehicle wheels for laterally constraining said wheels while providing for longitudinally guiding said wheels, said vehicle wheel guide elements being arranged in spaced parallel pairs for all portions of said courses with different portions of said courses extending in diverse directions, means connecting together adjacent portions of said courses and with certain of said differently extending course portions intersecting each other, said guide element wheel constraining walls of different course portions at intersections thereof providing lateral guiding surfaces for each respective course direction, a plurality of vehicles having wheels engaged with said guide element constraining walls for movement therealong, a vehicle guide wheel lateral constraining surface formed on a longitudinally extending guide track located between and extending parallel to said vehicle wheel guide element walls, a guide wheel for each of said vehicles, means securing each of said guide wheels to its respective vehicle in a position depending therefrom into engagement with said vehicle guide wheel track for movement therealong, a plurality of mutually insulated current conductors parallel to said guide element walls on said base structure each having a longitudinally extending exposed conductive surface, a plurality of current collectors for each of said vehicles, means securing each of said current collectors to each respective vehicle in a position extending therefrom into contact with the exposed conductive surfaces of a selected one of said conductors, current collectors extending from different of said vehicles being arranged in contact with different selected conductors, an electrically operated vehicle steering device in each of said vehicles, means electrically connecting each of said steering devices to a current collector of its respective vehicle, means for connecting said steering device with said vehicle guide wheel for turning said vehicle guide wheel toward a selected direction when said steering device is electrically energized for guiding said vehicle in said selected direction when said guide wheel moves into an intersection having a course portion extending in said selected direction, and an electrical control panel electrically connected to said conductors and having means for selectively and separately energizing said conductors selectively to control said electrically operated vehicle steering devices to turn their operatively connected vehicle guide wheels in a selected direction.

2. An amusement and educational device comprising an interconnected system as set forth in claim 1 with an electric drive motor in each of said vehicles, means electrically connecting each of said drive motors to a separate one of said current collectors of its respective vehicle from said current collector connected to its steering device, and said electrical control panel also having means for selectively and separately energizing said conductors selectively to control said drive motors to control propulsion of said vehicles.

3. An amusement and educational device comprising an interconnected system of a plurality of lengthwise supporting and guiding common courses for wheels of a plurality of wheeled vehicles, said courses each including a base structure for supporting said vehicles and vehicle wheel guide elements extending longitudinally of said base, each guide element comprising an upwardly projecting wall fixed to said base and adapted to be engaged by sides of vehicle wheels for laterally constraining said wheels while providing for longitudinally guiding said wheels, said vehicle wheel guide elements being arranged in spaced parallel pairs for all portions of said courses with different portions of said courses extending in diverse directions, means connecting together adjacent portions of said courses and with certain of said differently extending course portions intersecting each other, said guide element wheel constraining walls of different course portions at intersections thereof being intermittently discontinuous between common intersecting portions of said walls and providing lateral guiding surfaces for each respective course direction, a plurality of vehicles having wheels engaged with said guide element constraining walls for movement therealong, a vehicle guide wheel lateral constraining surface formed on a longitudinally extending guide track on said base structure extending parallel to said vehicle wheel guide element walls, a guide wheel for each of said vehicles, means securing each of said guide wheels to its respective vehicle in a position depending therefrom into engagement with said vehicle guide wheel track for movement therealong, a plurality of mutually insulated current conductors parallel to said guide element walls seated in said base structure each having a longitudinally extending exposed conductive surface above said base structure, a plurality of current collectors for each of said vehicles, means securing each of said current collectors to each respective vehicle in a position extending therefrom into contact with the exposed conductive surfaces of a selected one of said conductors, current collectors extending from different of said vehicles being arranged in contact with different selected conductors, an electrically operated vehicle steering device in each of said vehicles, means electrically connecting each of said steering devices to a current collector of its respective vehicle, means for connecting said steering device with said vehicle guide wheel for turning said vehicle guide wheel toward a selected direction when said steering device is electrically energized for guiding said vehicle in said selected direction when said guide wheel moves into an intersection having a course portion extending in said selected direction, and an electrical control panel electrically connected to said conductors and having means for selectively and separately energizing said conductors selectively to control said electrically operated vehicle steering devices to turn their operatively connected vehicle guide wheels in a selected direction.

4. An amusement and educational device comprising an interconnected system as set forth in claim 3 with an electric drive motor in each of said vehicles, means electrically connecting each of said drive motors to a separate one of said current collectors of its respective vehicle from said current collector connected to its steering device, and said electrical control panel also having means for selectively and separately energizing said conductors selectively to control said drive motors to control propulsion of said vehicles.

References Cited in the file of this patent

UNITED STATES PATENTS

| | | |
|---|---|---|
| 1,027,230 | Alandar | May 21, 1912 |
| 1,207,728 | Ellington | Dec. 12, 1916 |
| 1,225,008 | Brown | May 8, 1917 |
| 1,243,457 | Stuart | Oct. 16, 1917 |
| 1,497,382 | Rollason | June 10, 1924 |
| 1,668,249 | Rich | May 1, 1928 |
| 1,765,173 | Morrow | June 17, 1930 |
| 1,813,560 | Browne et al. | July 7, 1931 |
| 1,890,137 | Traver | Dec. 6, 1932 |
| 2,115,108 | Horn | Apr. 26, 1938 |
| 2,129,233 | Peffers | Sept. 6, 1938 |
| 2,172,468 | Giamo | Sept. 12, 1939 |
| 2,237,662 | Ferri | Apr. 8, 1941 |
| 2,661,070 | Ferrill | Dec. 1, 1953 |
| 2,661,852 | Bonanno | Dec. 8, 1953 |
| 2,687,304 | Northrup et al. | Aug. 24, 1954 |
| 2,696,532 | Hermann et al. | Dec. 7, 1954 |